United States Patent [19]

Howell

[11] Patent Number: 4,631,622
[45] Date of Patent: Dec. 23, 1986

[54] MULTIPLE STATIC TRIP CIRCUIT BREAKER COORDINATION

[75] Inventor: Edward K. Howell, Simsbury, Conn.

[73] Assignee: General Electric Company, New York, N.Y.

[21] Appl. No.: 687,880

[22] Filed: Dec. 31, 1984

[51] Int. Cl.[4] .............................................. H02H 3/28
[52] U.S. Cl. ....................................... 361/45; 361/44; 361/93; 361/62
[58] Field of Search ...................... 361/42–49, 361/62, 63, 87, 36, 93, 97

[56] References Cited

U.S. PATENT DOCUMENTS

| 2,363,895 | 11/1944 | Neher ................................ | 361/44 |
| 3,786,311 | 1/1974 | Hubson ............................. | 361/44 |
| 4,089,033 | 5/1978 | Mentler ........................... | 361/63 |

Primary Examiner—A. D. Pellinen
Assistant Examiner—H. L. Williams
Attorney, Agent, or Firm—Richard A. Menelly; Walter C. Bernkopf; Fred Jacob

[57] ABSTRACT

Differential current static trip circuits interconnected with upstream and downstream current sensing transformers in a protected system provide automatic coordination of the downstream static trip circuit breakers. The differential current transformer associated with the breakers vectorially sense the difference between the upstream breaker currents and the sum of the downstream breaker currents. The output is processed within the trip circuits for $I^2t$ and fixed time band delays to insure that the downstream breakers clear the fault.

5 Claims, 1 Drawing Figure

4,631,622

MULTIPLE STATIC TRIP CIRCUIT BREAKER COORDINATION

BACKGROUND OF THE INVENTION

This invention relates to the improved protection of a secondary distribution system by automatic coordination of the static trip circuit breaker characteristics. When an "upstream" breaker is feeding only "downstream" breakers, such that no loads per se, are connected directly to the upstream breaker, the upstream breaker can also provide low-current protection for phase-to-phase or phase-to-neutral faults occuring between the upstream and downstream breakers, in addition to and analagous to ground fault protection.

To sense a ground fault condition, one known approach is to compare the total current flowing in the distribution circuit from the source to the load with the total current returning from the load to the source. A ground fault exists if an imbalance or inequality in these currents is found, since some of the current leaving the source is then flowing through the ground fault and returning to the source via an extraneous ground circuit path and the ground return conductor connecting the source to ground. One way of detecting this current imbalance is to link all the distribution circuit conductors with a "zero sequence" differential current transformer core and look for a current induced in a secondary winding thereof by residual flux flowing in the core. An alternative approach to detecting this current imbalance is to connect the secondary windings of individual phase current transformers and a neutral current transformer, if a neutral conductor is present, into a summing circuit. If the vectorial summation of the secondary currents is zero, no ground fault conditions exist. However, if the vectorial summation of these secondary currents is not zero, then a ground fault condition is indicated. The differential secondary current is then sensed to develop a ground fault signal for processing pursuant to initiating a ground fault trip function. A good description of circuits employed for both overcurrent and ground fault protection is given in U.S. Pat. No. 4,271,444 entitled "Ground Fault Trip Mode Network For Static Trip Circuit Breakers" in the name of E. K. Howell, which patent is incorporated herein for purposes of reference.

The concept of zone interlock coordination between static trip circuit breakers, wherein tripping of an upstream breaker is delayed in order to give the downstream breaker closest to the fault occurrence sufficient time to trip, is also described in the aforementioned patent to Howell, as well as within later issued U.S. Pat. No. 4,468,714 entitled "Zone Selective Interlock Module For Use With Static Trip Circuit Breakers" in the name of Ronald R. Russell. This patent is incorporated herein for reference purpose and should be reviewed for a good description of the wiring interconnection between a plurality of upstream and downstream breakers for coordinating the short time and ground fault zone selective interlock functions of the breakers by selective adjustment of the trip time response characteristics of the upstream and downstream breakers.

One purpose of the instant invention is to describe a simplified circuit and wiring interconnection between a plurality of downstream circuit breakers and an upstream breaker for providing low current protection for phase-to-phase or phase-to-neutral faults occuring between the upstream and downstream breakers.

SUMMARY OF THE INVENTION

Coordination between an upstream breaker and a plurality of downstream breakers is provided by vectorially sensing the difference between the upstream breaker currents and the sum of the downstream breaker currents by means of a differential current transformer. The output of the transformers is then processed within a differential current trip circuit having both $I^2t$ and fixed-time-band characteristics. The fixed time truncation of the curve allows a downstream breaker to clear a fault which exceeds the linear range of its current transformers.

DESCRIPTION OF THE PREFERRED EMBODIMENT

Figure 1:
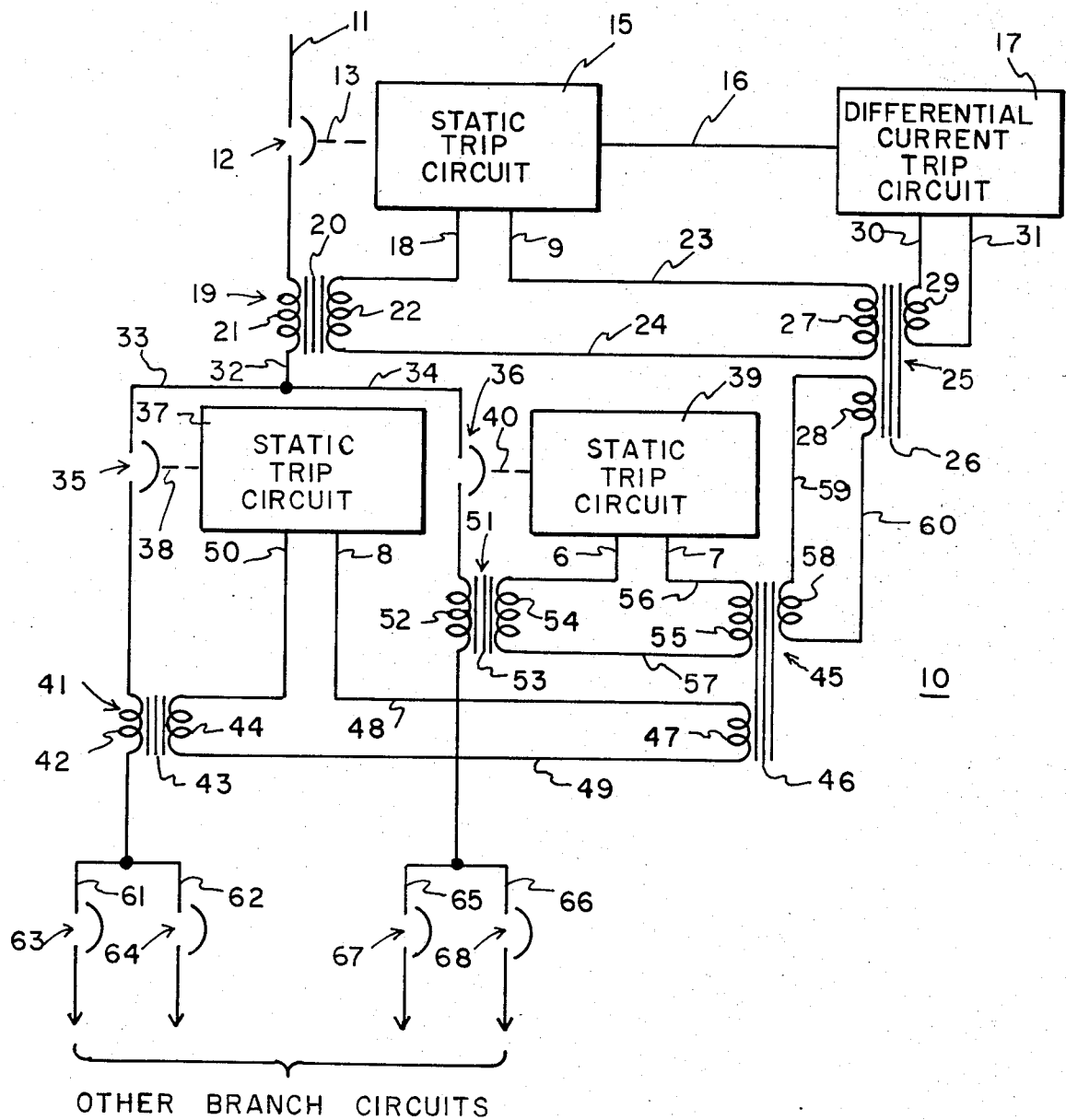
FIG. 1 is a diagrammatic representation of the multiple static trip circuit breaker coordination arrangement according to the invention.

A circuit arrangement for the improved protection of a secondary power distribution system by automatic coordination of breaker characteristics, hereafter "systematic protection" is shown at 10 in FIG. 1. An incoming power line 11, such as from a distribution transformer (not shown) feeds a power bus 14 through a pair of main or upstream contacts 12 which are operatively controlled by means of a main or upstream static trip circuit 15 over control link 13. Although one power bus is shown it is understood that three such buses are actually employed, one for each of these phase conductors and often an un-switched bus is also employed for the neutral conductor. Cohnected within the power bus is a main or upstream current sensing transformer 19 wherein a primary winding 21 is arranged around a core 20 and the secondary winding 22 is connected over conductors 23, 24 to the first primary winding 27 of a differential current transformer 25 arranged around a core 26. The static trip circuit is connected to the output of the upstream current sensing transformer 19 over conductors 18 and 9. The secondary winding 29 of the differential current transformer 25 is connected with a differential current trip circuit 17 over conductors 30, 31 as indicated. The operation of the static trip circuit for providing overcurrent protection and the operation of the differential current trip circuit for providing ground fault protection is fully described within the aforementioned Howell Patent. The arrangement and function of the differential current trip circuit 17 which is shown connected with the static trip circuit 15 by means of conductor 16 primarily differs from the Howell circuit by the interconnection with the downstream circuit breaker current sensing transformers, such as first branch or downstream circuit current sensing transformer 41 and a second branch or downstream circuit current sensing transformer 51. Power bus 32 interconnects with first and second downstream circuits 33, 34 through first downstream circuit contacts 35 and second downstream circuit contacts 36 respectively. The current through the first downstream circuit is sensed by means of the primary winding 42 arranged around a core 43 and the first downstream circuit contacts 35 are controlled by means of a static trip circuit 37 over control link 38. The output of the secondary winding 44 is connected with a first primary winding 47 of a differential current matching transformer 45 by means of conductors 48, 49 and with the static trip circuit 37 over conductors 50 and 8. The current through the second branch circuit 34 is sensed by means of the primary winding 52 arranged around a core 53 and the second branch circuit contacts 36 are controlled by means of a static trip circuit 39 over control link 40. The output of the secondary winding 54 is connected with a second primary winding 55 of the differential current matching transformer for vectorially summing the sensed currents flowing through the first and second downstream circuits 33 and 34 and with the static trip circuit 39 over conductors 6 and 7. The result of the vectorial summation is transformed through core 46 onto secondary winding 58 and transmitted to the second primary winding 28 of differential current transformer 25 over conductors 59, 60. The absolute value of the difference between the vectorial sum of the currents flowing in the downstream circuits and the current flowing in the upstream bus 14 results in a secondary current flow through the secondary winding of differential current transformer 25 which is applied to the differential current trip circuit 17 over conductors 30 and 31 for processing. A three-primary differential current transformer can be employed in place of the two primary differential current transformer 25 such that the vector summation of the downstream currents with the upstream current can be made by connecting conductors 56, 57 directly to one of the primary windings and conductors 48, 49 directly to another of the primary windings, with primary winding 27 connected with conductors 23, 24 constituting the third primary winding. The matching differential current transformer 45 is then eliminated and the output of the three primary differential current transformer secondary winding is directly applied to the differential current trip circuit 17 in a manner similar to that of the illustrated secondary winding 29.

The magnitude of the difference between the currents flowing in the upstream bus and downstream circuits provides a means of low current protection for phase-to-phase or phase-to-neutral faults occurring between the upstream or main breaker and the downstream or branch breakers. The adjustment of the $I^2t=K$ and fixed-time-band characteristics of the differential current trip circuit allows time for a downstream breaker to clear a fault which exceeds the linear range of its current transformers and hence provide an instantaneous trip function. The conventional long time, short time and instantaneous characteristics of the upstream static trip circuit could be set at the maximum values consistent with protecting the conductors between the upstream main breaker and the downstream breakers similar to conventional zone selective interlock. It is noted that the current sensing transformers 19, 41, 51 are shown arranged with respect to a single bus or conductor. This is for purposes of illustration only, since most industrial power systems employ the three phase circuit described earlier which require three separate conductors, and a fourth neutral conductor, each of which require a separate current sensing transformer. Alternatively, a single current sensing transformer can be used for each phase by arranging the same phase conductors within the same current transformer and employing a separate current transformer for each of the three phases.

With the arrangement of the systematic protection circuit 10 wherein there are no loads per se connected between the upstream contacts and the downstream contacts similar to the arrangement within a low voltage or medium voltage switchgear cabinet wherein the upstream and downstream breakers are in close proximity to each other, the interconnection between the current sensing transformers can be made without a large expense in materials and labor. For power systems having a "diversity factor" of zero, i.e. the rated current of the upstream breaker is equal to, or greater than, the sum of the rated currents of the immediate downstream breakers, then the only need for tripping the upstream breakers is the occurence of a fault on the conductors between the upstream and downstream breakers. In such a case, the static trip circuit 15 can be eliminated and operative connection can be made directly between the differential current trip circuit 17 and upstream contacts 12. The simplicity in the circuit detail required for providing a differential current trip circuit makes the disclosed systematic protection circuit economically attractive within electronic switchgear where several static trip circuit breakers are generally required.

The systematic protection arrangement can also be extended to branch circuits off the illustrated first and second downstream circuits 33, 34 such as branch circuits 61, 62 off first downstream circuit 33, employing downstream contacts 63, 64 and branch circuits 65, 66 off second downstream circuit 34, employing downstream contacts 67, 68. In this arrangement, the first downstream contacts 35 would be considered the "upstream" contacts relative to downstream contacts 63, 64 and the corresponding current sensing transformers (not shown) would be vectorially summed with the "upstream" current sensing transformer 42 through an additional differential current transformer and differential current trip circuit (not shown). It has thus been shown that by interconnection of the upstream current sensing transformer with the downstream current sensing transformers through a differential current transformer and a differential current trip circuit, protection can be provided within industrial switchgear with a substantial savings in both electronics and wiring over most standard wiring arrangements.

Having described my invention, what I claim as new and desire to secure by Letters Patent is:

1. A static trip circuit breaker coordination system comprising:

a first pair of separable contacts connected with a first current sensing transformer and controlled by a differential current trip circuit within a protected circuit;

a second pair of separable contacts in series with and downstream from said first contacts and connected with a second current sensing transformer;

a third pair of separable contacts downstream from said first contacts connected in parallel with said second contacts and connected with a third current sensing transformer;

a first differential current transformer connected with said second and third transformers for vectorial summing of downstream current through said second and third contacts; and a second differential current transformer connected with said first current sensing transformer and said first differential current transformer for vectorial subtracting of upstream current from said downstream current and opening said first contacts to interrupt said protected circuit upon the occurrence of a predetermined difference.

2. The static trip circuit breaker coordination system of claim 1 including a first static trip circuit connected with said first pair of separable contacts for providing first time overcurrent protection to said protected system.

3. The static trip circuit breaker system of claim 2 including a second static trip unit connected with said second contacts for providing second time overcurrent protection to said protected system.

4. The static trip circuit breaker coordination system of claim 3 including a third static trip unit connected with said third contacts for providing third time overcurrent protection to said protected system.

5. A method for providing coordination between upstream and downstream static trip circuit breakers within a protected system comprising the steps of:
  providing a first upstream current transformer within a protected circuit for sensing upstream current through a first pair of separable contacts within said circuit;
  providing a first downstream current transformer within said protected circuit for sensing downstream current through a second pair of separable contacts in series with said first contacts within said protected circuit;
  providing a second downstream current transformer within said protected circuit for sensing second downstream current through a third pair of separable contacts in parallel with said second contacts;
  connecting said first and second downstream current transformers to a first differential current transformer for vectorial summing of said first and second downstream currents;
  connecting a first differential current trip circuit and a second differential current transformer to said first differential current transformer and said first upstream current transformer; and
  vectorially subtracting said upstream current from said first and second downstream currents within said second differential current transformer and opening said first pair of separable contacts when said vectorial subtraction exceeds a first predetermined absolute value.

* * * * *